United States Patent
Tokunaga

(10) Patent No.: US 10,496,338 B2
(45) Date of Patent: Dec. 3, 2019

(54) ELECTRONIC APPARATUS, NON-TRANSITORY COMPUTER READABLE RECORDING MEDIUM, AND MANAGEMENT SYSTEM

(71) Applicant: KYOCERA DOCUMENT SOLUTIONS INC., Osaka (JP)

(72) Inventor: Tomoharu Tokunaga, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/261,614

(22) Filed: Jan. 30, 2019

(65) Prior Publication Data

US 2019/0235796 A1   Aug. 1, 2019

(30) Foreign Application Priority Data

Feb. 1, 2018 (JP) ................................. 2018-016434

(51) Int. Cl.
  *G06F 3/12* (2006.01)
  *H04L 12/24* (2006.01)
  *H04N 1/00* (2006.01)

(52) U.S. Cl.
  CPC .......... *G06F 3/1204* (2013.01); *G06F 3/1222* (2013.01); *G06F 3/1238* (2013.01); *H04L 41/22* (2013.01); *H04N 1/00411* (2013.01); *H04N 1/00514* (2013.01); *G06F 3/1292* (2013.01)

(58) Field of Classification Search
  CPC .... G06F 3/1204; G06F 3/1222; G06F 3/1238; G06F 3/1292; H04L 41/22; H04N 1/0041; H04N 1/00514

USPC ................................ 358/1.1–1.18, 402, 474
  See application file for complete search history.

(56) References Cited

U.S. PATENT DOCUMENTS

| 7,292,360 | B2 * | 11/2007 | Noda ...................... G06K 15/00 358/1.15 |
| 9,122,429 | B1 * | 9/2015 | Cecile .................... G06F 3/1204 |
| 2006/0044601 | A1 * | 3/2006 | Misawa .................. G06F 3/122 358/1.15 |
| 2006/0055968 | A1 * | 3/2006 | Sato .................... H04N 1/32358 358/1.15 |

(Continued)

FOREIGN PATENT DOCUMENTS

JP    2006229429 A    8/2006

*Primary Examiner* — Gabriel I Garcia
(74) *Attorney, Agent, or Firm* — Li & Cai Intellectual Property (USA) Office

(57) ABSTRACT

Electronic apparatus receives a user identifier from a user mobile device. User mobile device being a mobile device to which a user has logged in, the user identifier identifying the user, determines one or more available boxes with reference to attributes of one or more boxes, the one or more boxes storing data files sorted, the attributes being registered for the one or more boxes, the one or more available boxes being boxes available to the user identified by the user identifier, sends information indicating the one or more available boxes to the user mobile device, receives information indicating one selected box from the user mobile device, the one selected box being a box selected by the user from the one or more available boxes, generates display data and loads the display data in a work memory, the display data being used to display information about the selected box.

7 Claims, 9 Drawing Sheets

(56) References Cited

U.S. PATENT DOCUMENTS

2012/0162716 A1\* 6/2012 Maeda ............... H04N 1/00408
　　　　　　　　　　　　　　　　　　　　　　358/1.16
2012/0250059 A1\* 10/2012 Itogawa ................ G06F 3/1204
　　　　　　　　　　　　　　　　　　　　　　358/1.13

\* cited by examiner

ELECTRONIC APPARATUS, NON-TRANSITORY COMPUTER READABLE RECORDING MEDIUM, AND MANAGEMENT SYSTEM

CROSS REFERENCE TO RELATED APPLICATION

This application claims the benefit of Japanese Priority Patent Applications JP 2018-016434 filed Feb. 1, 2018, the entire contents of which are incorporated herein by reference.

BACKGROUND OF THE INVENTION

1. Field of the Invention

The present disclosure relates to an electronic apparatus including a nonvolatile storage device including one or more boxes for storing data files sorted. The present disclosure further relates to a non-transitory computer readable recording medium that records an information processing program executable by the electronic apparatus. The present disclosure further relates to a management system including the electronic apparatus.

2. Description of Related Art

There is known a technology of managing the security of boxes of an electronic apparatus shared by a plurality of users such as an image forming apparatus. The boxes store data files sorted.

It is desirable for an electronic apparatus shared by a plurality of users to manage the security of boxes for storing data files sorted and, at the same time, to allow the users to use the electronic apparatus without difficulties.

SUMMARY OF THE INVENTION

According to an embodiment of the present disclosure, there is provided an electronic apparatus, including:
a controller that
receives a user identifier from a user mobile device, the user mobile device being a mobile device to which a user has logged in, the user identifier identifying the user,
determines one or more available boxes with reference to attributes of one or more boxes, the one or more boxes storing data files sorted, the attributes being registered for the one or more boxes, the one or more available boxes being boxes available to the user identified by the user identifier,
sends information indicating the one or more available boxes to the user mobile device,
receives information indicating one selected box from the user mobile device, the one selected box being a box selected by the user from the one or more available boxes,
generates display data and loads the display data in a work memory, the display data being used to display information about the selected box,
determines whether or not a distance to the user mobile device is equal to or smaller than a first distance, and
if determining that the distance to the user mobile device is equal to or smaller than the first distance, displays the loaded information on a display device.

According to an embodiment of the present disclosure, there is provided a non-transitory computer readable recording medium that records an information processing program, the information processing program causing a controller of an electronic apparatus to:
receive a user identifier from a user mobile device, the user mobile device being a mobile device to which a user has logged in, the user identifier identifying the user;
determine one or more available boxes with reference to attributes of one or more boxes, the one or more boxes storing data files sorted, the attributes being registered for the one or more boxes, the one or more available boxes being boxes available to the user identified by the user identifier;
send information indicating the one or more available boxes to the user mobile device;
receive information indicating one selected box from the user mobile device, the one selected box being a box selected by the user from the one or more available boxes;
generate display data and loads the display data in a work memory, the display data being used to display information about the selected box;
determine whether or not a distance to the user mobile device is equal to or smaller than a first distance; and
if determining that the distance to the user mobile device is equal to or smaller than the first distance, display the loaded information on a display device.

According to an embodiment of the present disclosure, there is provided a management system, including:
an electronic apparatus; and
a user mobile device, the user mobile device being a mobile device to which a user has logged in,
the electronic apparatus including a controller that
receives a user identifier from a user mobile device, the user mobile device being a mobile device to which a user has logged in, the user identifier identifying the user,
determines one or more available boxes with reference to attributes of one or more boxes, the one or more boxes storing data files sorted, the attributes being registered for the one or more boxes, the one or more available boxes being boxes available to the user identified by the user identifier,
sends information indicating the one or more available boxes to the user mobile device,
receives information indicating one selected box from the user mobile device, the one selected box being a box selected by the user from the one or more available boxes,
generates display data and loads the display data in a work memory, the display data being used to display information about the selected box,
determines whether or not a distance to the user mobile device is equal to or smaller than a first distance, and
if determining that the distance to the user mobile device is equal to or smaller than the first distance, displays the loaded information on a display device.

These and other objects, features and advantages of the present disclosure will become more apparent in light of the following detailed description of best mode embodiments thereof, as illustrated in the accompanying drawings.

DETAILED DESCRIPTION OF THE PREFERRED EMBODIMENTS

Hereinafter, embodiments of the present disclosure will be described with reference to the drawings. In the embodiments, an image forming apparatus (Multifunction Peripheral, hereinafter referred to as MFP) will be described as an example of an electronic apparatus.

I. First Embodiment

1. Management System

Figure 1:
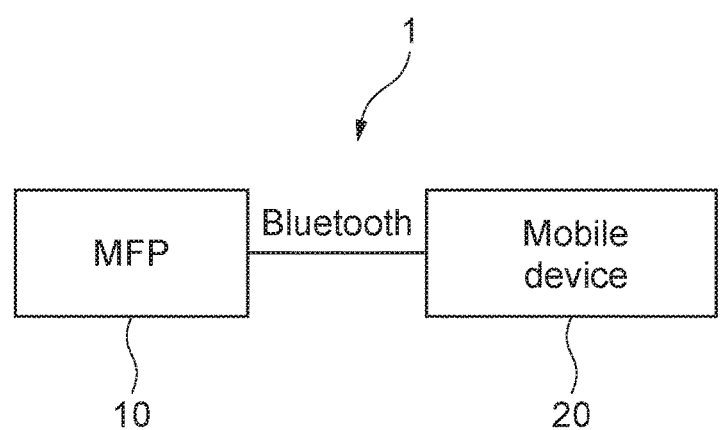
FIG. 1 shows a management system according to a first embodiment of the present disclosure.

FIG. 1 shows a management system according to a first embodiment of the present disclosure.

The management system 1 includes the MFP 10 and the mobile device 20. The MFP 10 and the mobile device 20 are capable of communicating with each other via at least near field communication such as Bluetooth (registered trademark).

The MFP 10 is, typically, in an office. A nonvolatile storage device (storage device 18 of FIG. 2) of the MFP 10 includes one or more boxes for storing data files sorted. In the present embodiment, a "box function" means a function of outputting (printing, etc.) a data file stored in a box of the nonvolatile storage device of the MFP 10.

The mobile device 20 is a device to be always carried by a user (typically, worker at office) of the MFP 10. The mobile device 20 is, for example, a smartphone, a wearable device, or the like.

2. Hardware Configuration of Image Forming Apparatus

Figure 2:
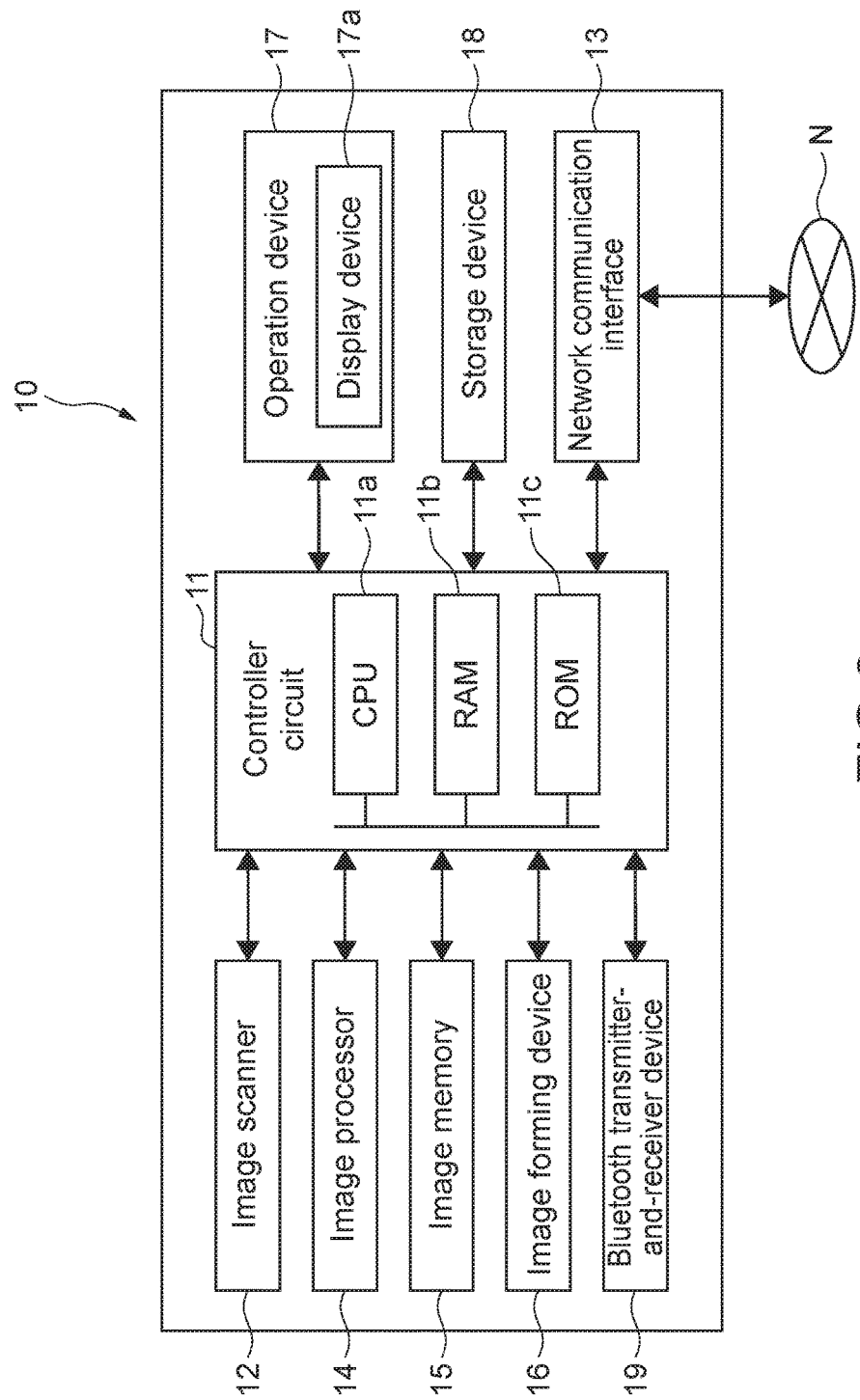
FIG. 2 shows a hardware configuration of an image forming apparatus.

FIG. 2 shows a hardware configuration of an image forming apparatus.

The MFP 10 includes the controller circuit 11 (controller). The controller circuit 11 includes the CPU (Central Processing Unit) 11a (processor), the RAM (Random Access Memory) 11b, the ROM (Read Only Memory) 11c (memory), dedicated hardware circuits, and the like and performs overall operational control of the MFP 10. A computer program that causes the MFP 10 to operate as the respective functional units (to be described later) is stored in a non-transitory computer readable recording medium such as a ROM.

The controller circuit 11 is connected to the image scanner 12, the image processor 14, the image memory 15, the image forming device 16, the operation device 17, the storage device 18, the network communication interface 13, the transmitter-and-receiver device 19, and the like. The controller circuit 11 performs operational control of the respective devices connected thereto and sends/receives signals and data to/from those devices.

According to job execution instructions input by a user via the operation device 17 or a personal computer (not shown) connected to a network, the controller circuit 11 controls drive and processing of mechanisms requisite for executing operational control of functions such as a scanner function, a printing function, and a copy function.

The image scanner 12 reads an image from a document.

The image processor 14 carries out image processing as necessary on image data of an image read by the image scanner 12. For example, the image processor 14 corrects shading of an image read by the image scanner 12 and carries out other image processing to improve the quality of the image to be formed.

The image memory 15 includes an area that temporarily stores data of a document image read by the image scanner 12 or data to be printed by the image forming device 16.

The image forming device 16 is a printer that forms an image on paper based on image data read by the image scanner 12, for example.

The operation device 17 includes a touch panel device and an operation key device that accept user's instructions on various operations and processing executable by the MFP 1. The touch panel device includes the display device 17a such as an LCD (Liquid Crystal Display) and an organic EL (Electroluminescence) display including a touch panel.

The network communication interface 13 is an interface used for connecting to the network N.

The storage device 18 is a large-volume storage device such as an HDD (Hard Disk Drive) that stores a document image read by the image scanner 12, and the like. The storage device 18 may further include a detachably-connected mobile storage medium (for example, USB (Universal Serial Bus) memory) and its interface.

The transmitter-and-receiver device 19 transmits and receives radio waves in conformity with the Bluetooth (registered trademark) standard.

3. Hardware Configuration of Mobile Device

Figure 3:
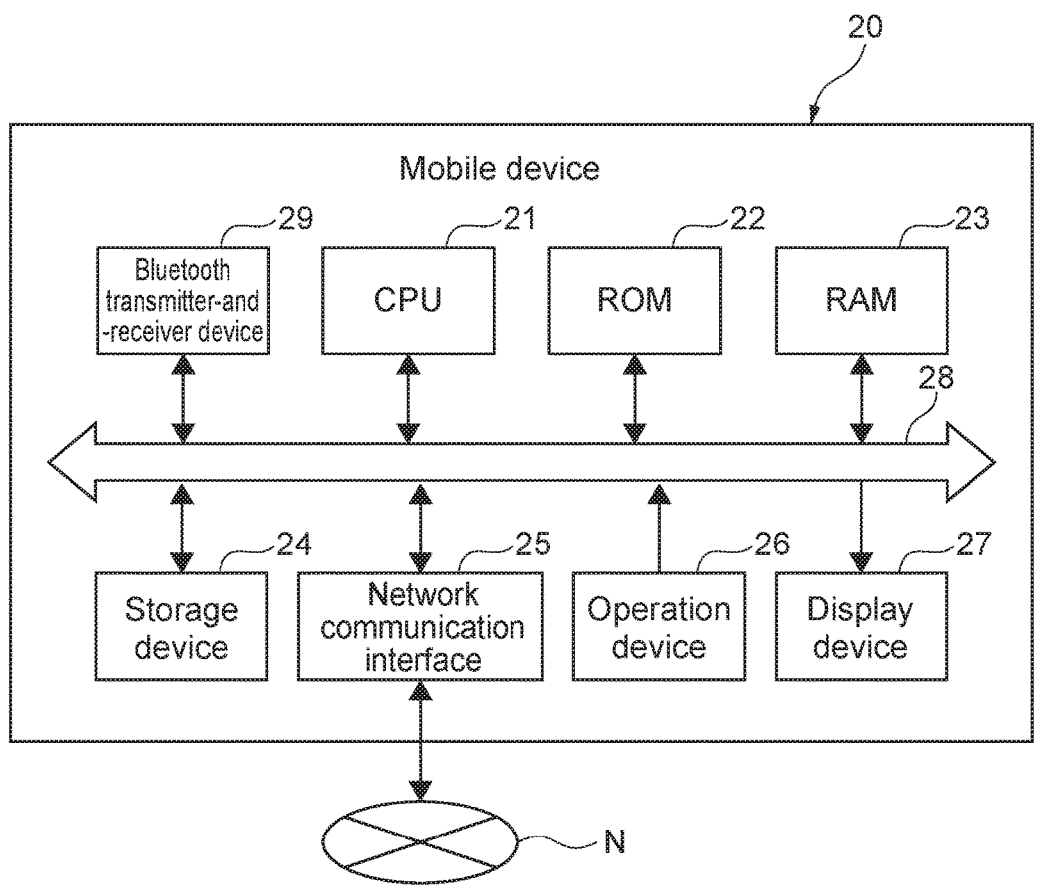
FIG. 3 shows a hardware configuration of a mobile device.

FIG. 3 shows a hardware configuration of a mobile device.

The mobile device 20 includes the CPU 21, the ROM 22, the RAM 23, the storage device 24, the network communication interface 25, the operation device 26, the display device 27, and the transmitter-and-receiver device 29, and the bus 28 connecting them to each other.

The CPU 21 loads information processing programs stored in the ROM 22 in the RAM 23 and executes the information processing programs. The ROM 22 stores programs executed by the CPU 21, data, and the like nonvolatile. The ROM 22 is an example of a non-transitory computer readable recording medium.

The storage device 24 is a large-volume record medium such as an SSD (Solid State Drive).

The network communication interface 25 is an interface used for connecting to the network N.

The operation device 26 includes a touch panel, various switches, and the like. The operation device 26 detects operations input by a user, and outputs information to the CPU 21.

The display device 27 includes an LCD, an organic EL display, or the like. The display device 27 executes arithmetic processing based on information received from the CPU 21, and displays generated image signals on a display.

The transmitter-and-receiver device 29 transmits and receives radio waves in conformity with the Bluetooth (registered trademark) standard.

4. Functional Configuration of Management System

Figure 4:
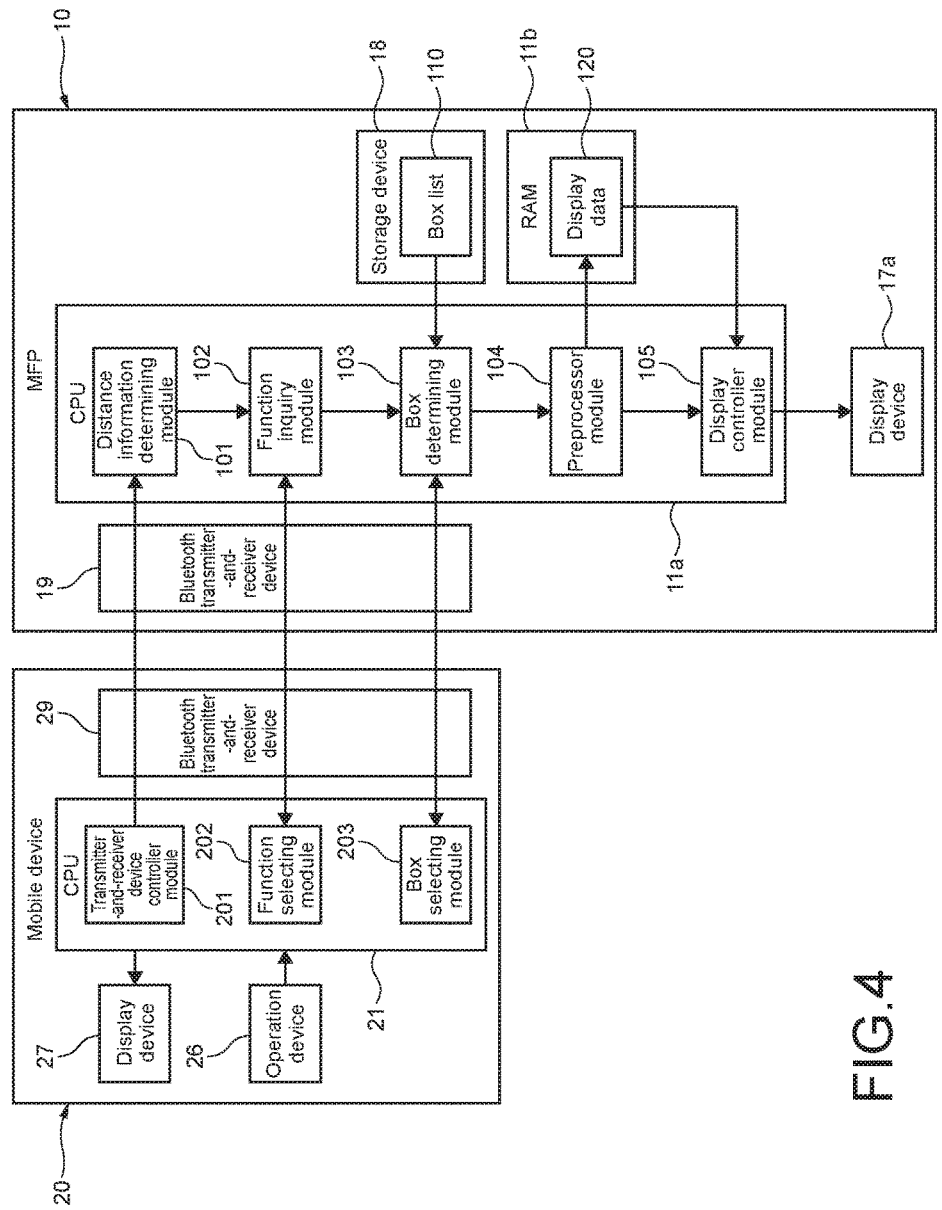
FIG. 4 shows a functional configuration of the management system.

FIG. 4 shows a functional configuration of the management system.

The CPU 11a of the MFP 10 loads an information processing program recorded in the ROM 11c in the RAM 11b and executes the information processing program to thereby operate as the distance information determining module 101, the function inquiry module 102, the box determining module 103, the preprocessor module 104, and the display controller module 105.

The CPU 21 of the mobile device 20 loads an information processing program recorded in the ROM 22 in the RAM 23 and executes the information processing program to thereby operate as the transmitter-and-receiver device controller module 201, the function selecting module 202, and the box selecting module 203.

The transmitter-and-receiver device controller module 201 of the mobile device 20 controls the transmitter-and-receiver device 29 to start transmitting radio waves and thereafter keep on periodically transmitting the radio waves.

The distance information determining module 101 of the MFP 10 receives the radio waves from the mobile device 20 via the transmitter-and-receiver device 19. The distance information determining module 101 determines an approximate distance from the MFP 10 to the mobile device 20 based on the strength of the radio waves.

The function inquiry module 102 of the MFP 10 sends an inquiry for a function-to-be-used (box function, copy function, scan function, etc.) of the MFP 10 to the mobile device 20 via the transmitter-and-receiver device 19.

The function selecting module 202 of the mobile device 20 receives the inquiry for a function-to-be-used of the MFP 10 from the MFP 10 via the transmitter-and-receiver device 29. The function selecting module 202 sends a notification of function-to-be-used to the MFP 10 via the transmitter-and-receiver device 29.

The function inquiry module 102 of the MFP 10 receives the notification of the function-to-be-used from the mobile device 20 via the transmitter-and-receiver device 19.

The box determining module 103 of the MFP 10 determines one or more boxes (available boxes) available to a user (i.e., user who has logged in to the mobile device 20) identified by a user identifier included in the radio waves from the mobile device 20 with reference to the box list 110. The box determining module 103 sends information indicating the one or more available boxes to the mobile device 20 via the transmitter-and-receiver device 19.

The box selecting module 203 of the mobile device 20 receives the information indicating the one or more available boxes from the MFP 10 via the transmitter-and-receiver device 29. The box selecting module 203 sends information indicating an available box (selected box) selected by a user to the MFP 10 via the transmitter-and-receiver device 29.

The box determining module 103 of the MFP 10 receives the information indicating the selected box from the mobile device 20 via the transmitter-and-receiver device 19.

The preprocessor module 104 the MFP 10 generates the display data 120, which is used to display information about the selected box. The preprocessor module 104 loads the display data 120 in the RAM 11b (work memory).

The display controller module 105 of the MFP 10 displays the information about the selected box on the display device 17a based on the display data 120 loaded in the RAM 11b.

5. Operational Flow of Management System

Figure 5:
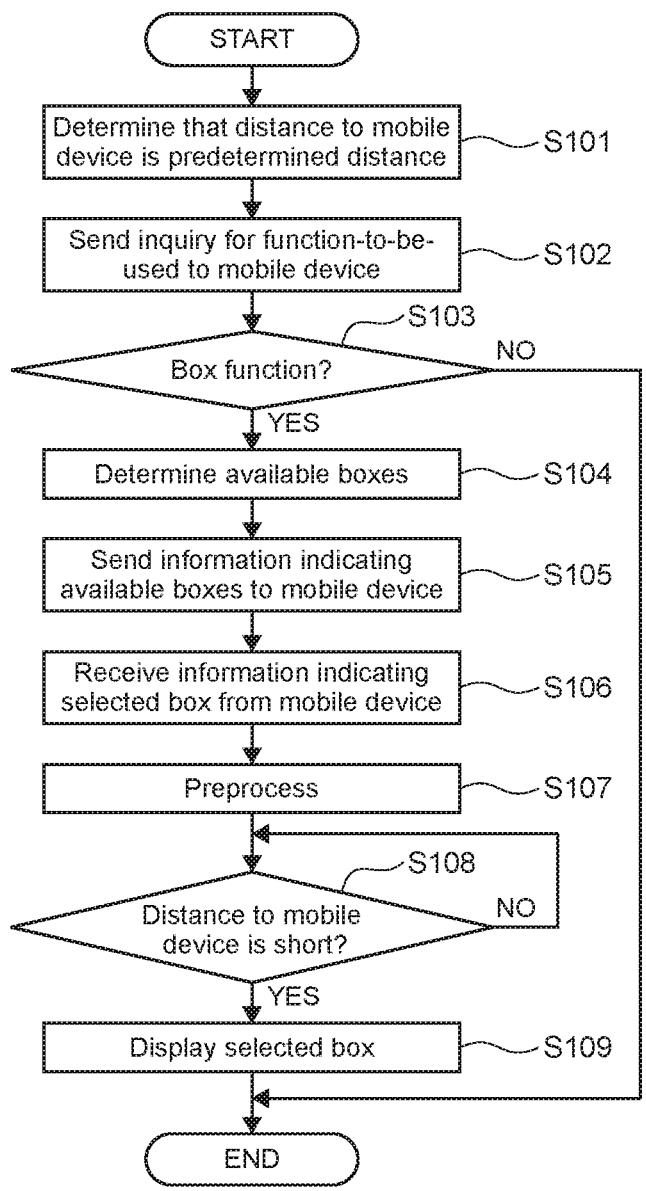
FIG. 5 shows an operational flow of the image forming apparatus.
Figure 6:
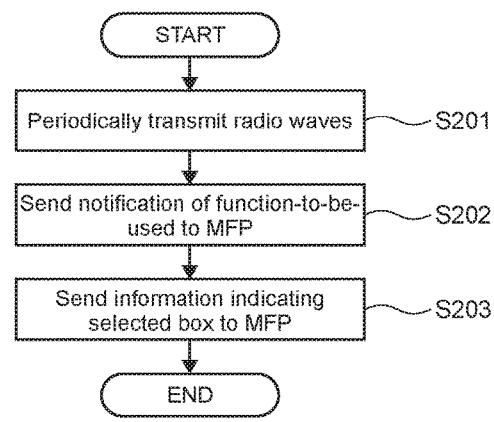
FIG. 6 shows an operational flow of the mobile device.

FIG. 5 shows an operational flow of the image forming apparatus. FIG. 6 shows an operational flow of the mobile device.

As a presumption, a user has logged in to the mobile device 20. The user, who carries the mobile device 20, is going to the MFP 10 to use a function (box function, copy function, scan function, etc.) of the MFP 10. The transmitter-and-receiver device controller module 201 of the mobile device 20 controls the transmitter-and-receiver device 29 to start transmitting radio waves and thereafter keep on periodically transmitting the radio waves (Step S201). The radio waves are signals at least including a user identifier identifying the user who has logged in to the mobile device 20.

The distance information determining module 101 of the MFP 10 receives the radio waves (including user identifier) from the mobile device 20 via the transmitter-and-receiver device 19. If the distance information determining module 101 detects a radio wave having a predetermined strength or more, the distance information determining module 101 determines that the distance from the MFP 10 to the mobile device 20 is a predetermined distance (for example, long distance about 30 meters) (Step S101). In the present embodiment, the predetermined strength is set for the MFP 10 as a radio wave strength corresponding to the predetermined distance. For example, the predetermined distance may be about a border of a range in which the distance from the MFP 10 is not out of the floor.

Then, the function inquiry module 102 of the MFP 10 sends an inquiry for a function-to-be-used (box function, copy function, scan function, etc.) of the MFP 10 to the mobile device 20 via the transmitter-and-receiver device 19 (Step S102).

The function selecting module 202 of the mobile device 20 receives the inquiry for the function-to-be-used of the MFP 10 from the MFP 10 via the transmitter-and-receiver device 29. The function selecting module 202 displays selectable functions of the MFP 10 on the display device 27. The function selecting module 202 detects an operation input in the operation device 26 by a user to determine a function-to-be-used selected by the user. The function selecting module 202 sends a notification of the function-to-be-used to the MFP 10 via the transmitter-and-receiver device 29 (Step S202).

The function inquiry module 102 of the MFP 10 receives the notification of the function-to-be-used from the mobile device 20 via the transmitter-and-receiver device 19. If the function inquiry module 102 determines that the function-to-be-used is a box function, the following procedure will be executed (Step S103, YES).

The box determining module 103 of the MFP 10 reads the box list 110 from the storage device 18. The box list 110 stores at least box identifiers identifying one or more boxes, respectively, and attributes in association with each other. The "attribute" is information about box use condition. The "box use condition" is information about an available capacity of a box (if available capacity is smaller than predetermined value, box cannot be used), and information about security. The "information about security" is, specifically, information about a password, a public/confidential status, and the like. The box determining module 103 determines one or more boxes available to a user (i.e., user who has logged in to the mobile device 20) identified by a user identifier included in the radio wave from the mobile device 20 with reference to the attribute stored in the box list 110 (Step S104). The "box available to a user who has logged in to the mobile device 20" will be referred to as an "available box". The box determining module 103 sends information indicating the one or more available boxes to the mobile device 20 via the transmitter-and-receiver device 19 (Step S105).

The box selecting module 203 of the mobile device 20 receives the information indicating the one or more available boxes from the MFP 10 via the transmitter-and-receiver device 29. The box selecting module 203 displays the one or more available boxes on the display device 27. The box selecting module 203 detects an operation input in the operation device 26 by a user to determine an available box selected by a user. The "available box selected by a user" will be referred to as a "selected box". The box selecting module 203 sends information indicating the selected box to the MFP 10 via the transmitter-and-receiver device 29 (Step S203).

The box determining module 103 of the MFP 10 receives the information indicating the selected box from the mobile device 20 via the transmitter-and-receiver device 19 (Step S106). Then, the preprocessor module 104 generates the display data 120 for displaying information about the selected box and loads the display data 120 in the RAM 11*b* (work memory) in order to immediately display the display data 120 on the display device 27 (Step S107). The "information about the selected box" includes information (file names, etc.) about data files stored in the selected box. Note that, after the preprocessor module 104 loads the display data 120 for displaying the information about the selected box in the RAM 11*b*, the preprocessor module 104 stands by without immediately displaying the information about the selected box (Step S108, NO).

By the way, the transmitter-and-receiver device controller module 201 of the mobile device 20 controls the transmitter-and-receiver device 29 to keep on periodically transmitting the radio waves (Step S201).

The distance information determining module 101 of the MFP 10 receives the radio waves from the mobile device 20 via the transmitter-and-receiver device 19. If the distance information determining module 101 detects a radio wave having the first strength or more, the distance information determining module 101 determines that the distance from the MFP 10 to the mobile device 20 is equal to or smaller than the first distance (short distance) range (Step S108, YES). In the present embodiment, the first strength is set for the MFP 10 as a radio wave strength corresponding to the first distance. The first distance may be extremely a short distance (about 1 meter) from the MFP 10. Then, the display controller module 105 of the MFP 10 displays the information about the selected box on the display device 17*a* based on the display data 120 loaded in the RAM 11*b* (Step S109).

The user, who carries the mobile device 20, for example, operates the operation device 17 to use the box function with reference to the information about the selected box displayed on the display device 17*a* of the MFP 10.

When execution of the information processing program is finished, the transmitter-and-receiver device controller module 201 of the mobile device 20 controls the transmitter-and-receiver device 29 to finish transmitting the radio waves.

6. Conclusion

It is desirable for an MFP shared by a plurality of users to manage the security of boxes for storing data files sorted.

In view of the aforementioned circumstances, according to the present embodiment, the box determining module 103 of the MFP 10 determines one or more boxes available to a user (i.e., user who has logged in to the mobile device 20) identified by a user identifier included in the radio wave from the mobile device 20 with reference to the attribute stored in the box list 110 (Step S104).

As a result, it is possible to determine an available box available to each user without need of logging in to the MFP 10 by each user.

Further, according to the present embodiment, the box determining module 103 of the MFP 10 sends information indicating the one or more available boxes to the mobile device 20 via the transmitter-and-receiver device 19 (Step S105). The box determining module 103 receives the information indicating the selected box from the mobile device 20 via the transmitter-and-receiver device 19.

As a result, it is possible to determine the selected box before a user arrives at the MFP 10. As a result, it is not necessary to select a box after the user arrives at the MFP 10. The number of processing executed after the user arrives at the MFP 10 is reduced. Since a plurality of users share the MFP 10, in some cases, a plurality of users would like to operate the MFP 10 at the same time. When one user is operating the MFP 10, the other users cannot operate the MFP 10. As a result, the longer the time period in which one user operates the MFP 10, the later the time to start operating the MFP 10 by another user. However, according to the present embodiment, since the number of processing executed after the user arrives at the MFP 10 is reduced, the time period in which each one user operates the MFP 10 may be reduced.

Further, according to the present embodiment, the preprocessor module 104 of the MFP 10 generates the display data 120 for displaying information about the selected box and loads the display data 120 in the RAM 11*b* (work memory) (Step S107).

As a result, it is possible to display the information about the selected box on the display device 27 immediately after a user arrives at the MFP 10. As a result, the number of processing executed after the user arrives at the MFP 10 is further reduced, and therefore the time period in which each one user operates the MFP 10 may be further reduced.

II. Second Embodiment

In the following description, the configurations, the operations, and the like similar to those described above will be denoted by similar reference symbols, description thereof will be omitted, and different points will be described mainly.

In the first embodiment, the information (attribute) about security stored in the box list 110 is, specifically, information about a password, a public/confidential status, and the like. To the contrary, in the second embodiment, the information (attribute) about security stored in the box list 110 further includes an administrator identifier, which is information identifying an administrator. The "administrator" is an administrator of the box, for example, a creator of the box, or the like.

1. Management System

Figure 7:
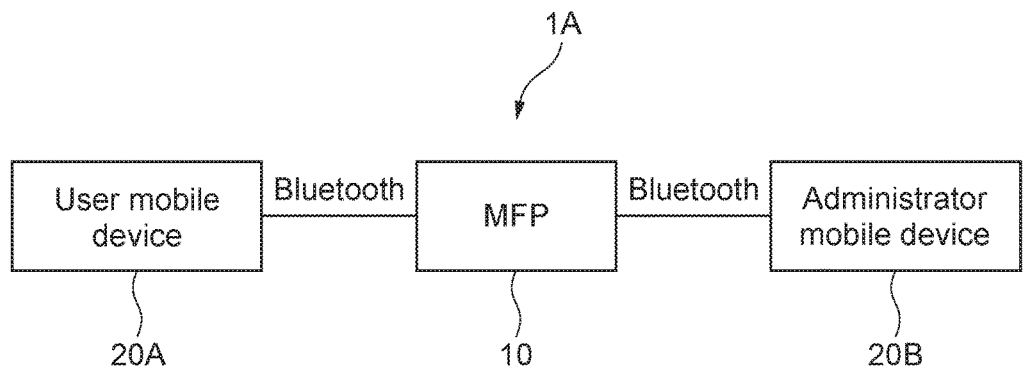
FIG. 7 shows a management system according to a second embodiment of the present disclosure.

FIG. 7 shows a management system according to a second embodiment of the present disclosure.

The management system 1A includes the MFP 10, the user mobile device 20A, and the administrator mobile device 20B. The MFP 10 and the user mobile device 20A are capable of communicating with each other via at least near field communication such as Bluetooth (registered trademark). The MFP 10 and the administrator mobile device 20B are capable of communicating with each other via at least near field communication such as Bluetooth (registered trademark).

The user mobile device 20A corresponds to the mobile device 20 of the first embodiment. In other words, the user mobile device 20A is a device carried by a user who uses the box function of the MFP 10.

The administrator mobile device 20B is a device carried by an administrator of the box. The hardware configuration of the administrator mobile device 20B is similar to the hardware configuration of the mobile device 20 of the first embodiment.

2. Functional Configuration of Management System

Figure 8:
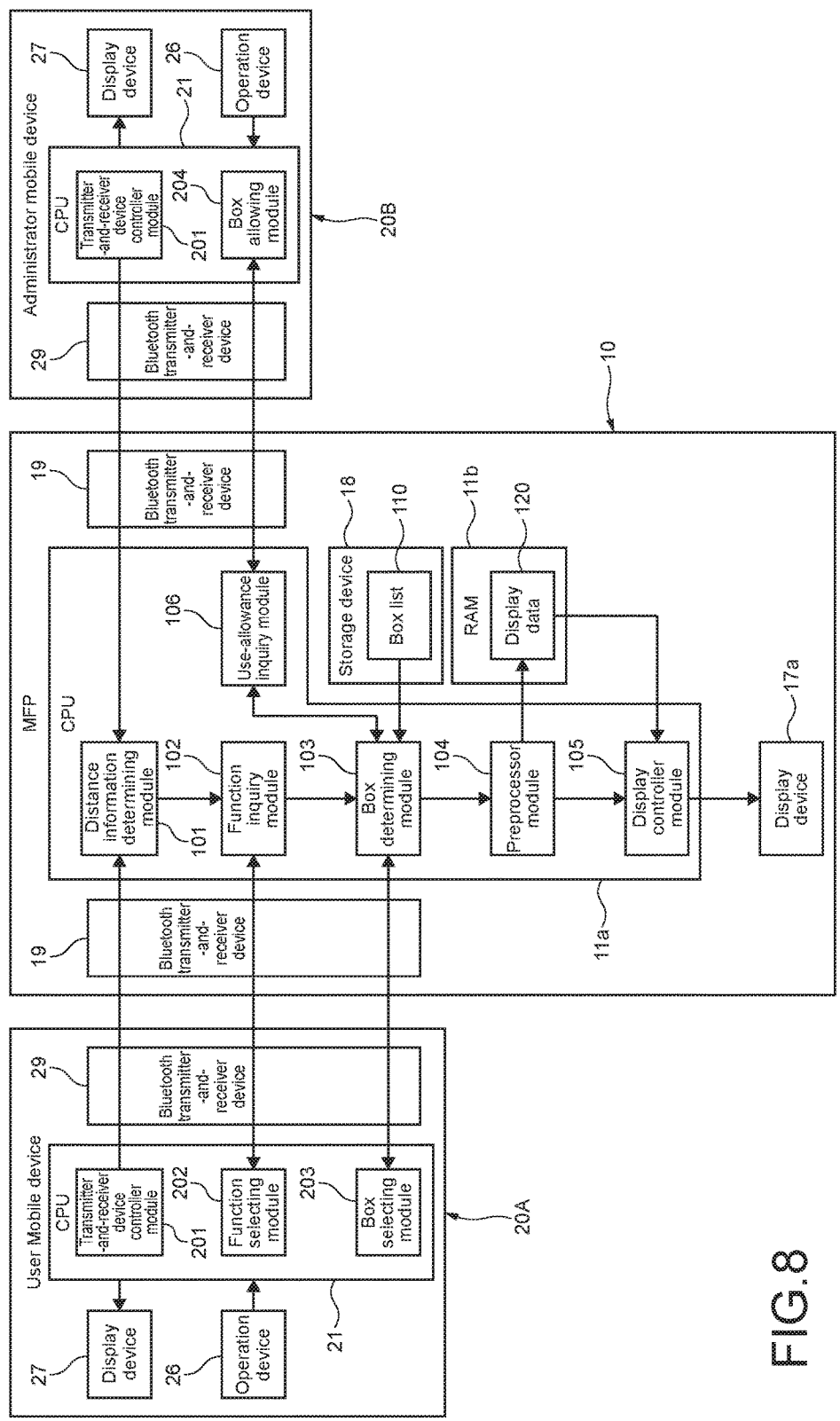
FIG. 8 shows a functional configuration of the management system.

FIG. 8 shows a functional configuration of the management system.

The CPU 11a of the MFP 10 loads an information processing program recorded in the ROM 11c in the RAM 11b and executes the information processing program to thereby further operate as the use-allowance inquiry module 106.

The CPU 21 of the administrator mobile device 20B loads an information processing program recorded in the ROM 22 in the RAM 23 and executes the information processing program to thereby operate as the transmitter-and-receiver device controller module 201 (same as the first embodiment) and the box allowing module 204.

The box determining module 103 of the MFP 10 determines whether or not the attribute in association with the selected box includes an administrator identifier with reference to the box list 110. In addition, the box determining module 103 of the MFP 10 determines whether or not the administrator is different from the user who has logged in to the user mobile device 20A.

The distance information determining module 101 of the MFP 10 receives the radio waves from the administrator mobile device 20B via the transmitter-and-receiver device 19. The distance information determining module 101 determines an approximate distance from the MFP 10 to the administrator mobile device 20B based on the strength of the radio waves.

The use-allowance inquiry module 106 of the MFP 10 sends an inquiry inquiring whether or not to allow the use of the selected box in association with the administrator identifier to the administrator mobile device 20B via the transmitter-and-receiver device 19.

The box allowing module 204 of the administrator mobile device 20B receives the inquiry inquiring whether or not to allow the use of the selected box from the MFP 10 via the transmitter-and-receiver device 29. The box allowing module 204 sends a response that the use of the selected box is allowed/not allowed to the MFP 10 via the transmitter-and-receiver device 29.

The use-allowance inquiry module 106 of the MFP 10 receives the response that the use of the selected box is allowed/not allowed from the administrator mobile device 20B via the transmitter-and-receiver device 19. The use-allowance inquiry module 106 determines whether the use of the selected box is allowed/not allowed by an administrator.

3. Operational Flow of Management System

Figure 9:
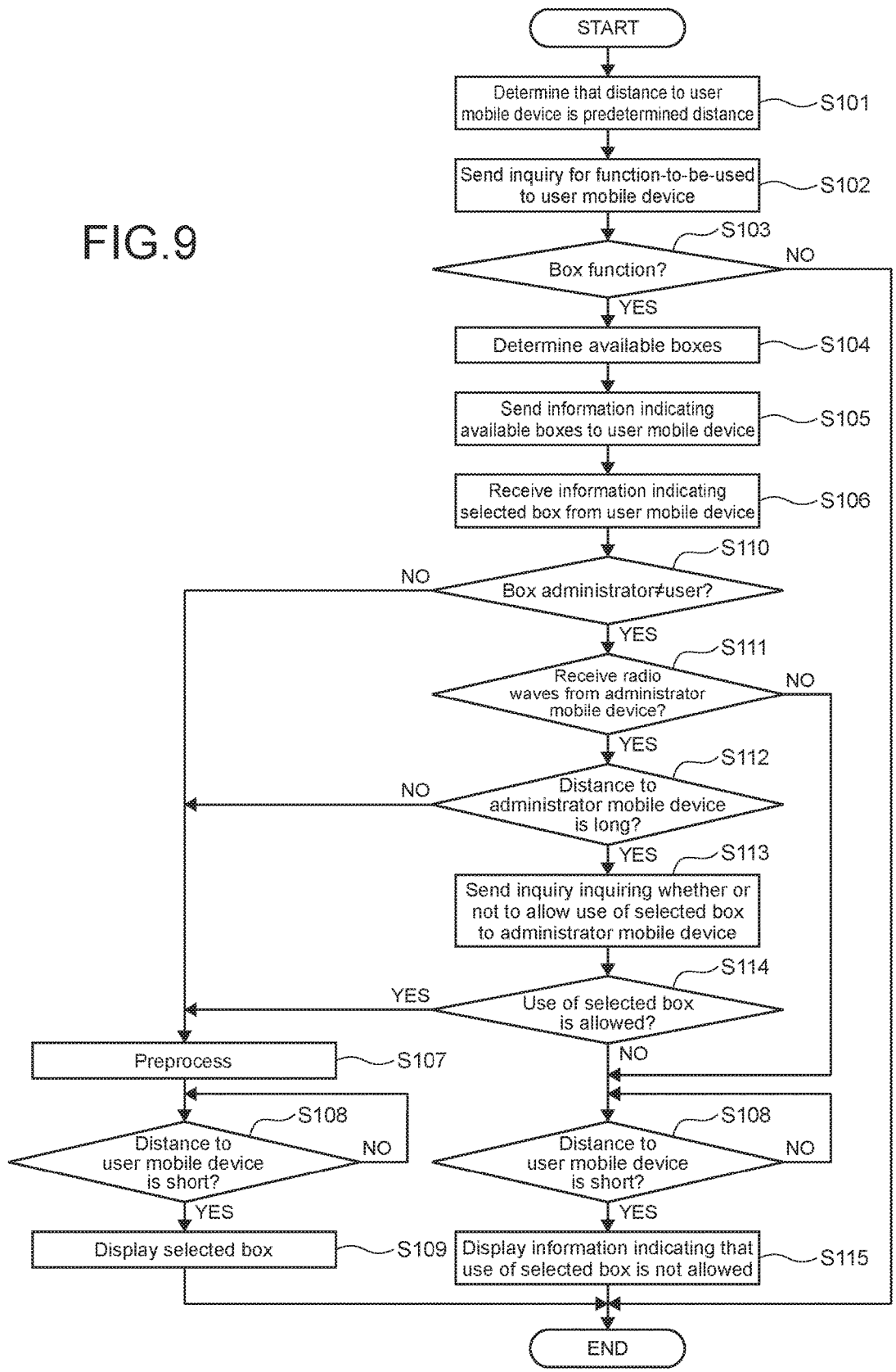
FIG. 9 shows an operational flow of the image forming apparatus.
Figure 10:
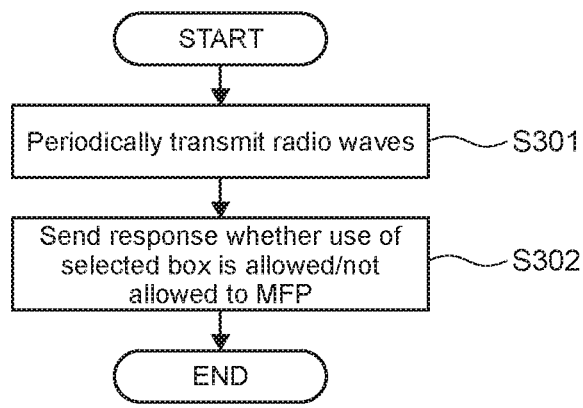
FIG. 10 shows an operational flow of the administrator mobile device.

FIG. 9 shows an operational flow of the image forming apparatus. FIG. 10 shows an operational flow of the administrator mobile device.

The operation of the user mobile device 20A is the same as the operation of Step S201 to Step S203 of the mobile device 20 of the first embodiment. The operation of Step S101 to Step S106 of the MFP 10 is the same as the operation of the first embodiment. Therefore the operation of and after Step S106 of the MFP 10 and the operation of the administrator mobile device 20B will be described.

The box determining module 103 of the MFP 10 receives information indicating the selected box from the user mobile device 20A via the transmitter-and-receiver device 19 (Step S106). Then, with reference to the box list 110, the box determining module 103 determines whether or not the attribute in association with the selected box includes an administrator identifier and, at the same time, whether or not the administrator is different from the user who has logged in to the user mobile device 20A (Step S110). If the attribute in association with the selected box does not include an administrator identifier, and if an administrator identifier included in the attribute in association with the selected box indicates the user who has logged in to the user mobile device 20A (Step S110, NO), the flow proceeds to Step S107 to Step S109 (same as the first embodiment).

Meanwhile, a case where the attribute in association with the selected box includes an administrator identifier and, at the same time, the administrator is different from the user who has logged in to the user mobile device 20A (Step S110, YES) will be described.

As a presumption, an administrator has logged in to the administrator mobile device 20B. The transmitter-and-receiver device controller module 201 of the administrator mobile device 20B controls the transmitter-and-receiver device 29 to start transmitting radio waves and thereafter keep on periodically transmitting the radio waves (Step S301). The radio waves are signals at least including an administrator identifier identifying the administrator who has logged in to the administrator mobile device 20B.

The distance information determining module 101 of the MFP 10 receives the radio waves (including administrator identifier) from the administrator mobile device 20B via the transmitter-and-receiver device 19 (Step S111, YES). If the distance information determining module 101 detects a radio wave having a second strength or more, the distance information determining module 101 determines that the distance from the MFP 10 to the administrator mobile device 20B is within a second distance (for example, long distance about 30 meters) (Step S112, NO). In the present embodiment, the second strength is set for the MFP 10 as a radio wave strength corresponding to the second distance. It means that the administrator, who carries the administrator mobile device 20B, is not very far from the MFP 10, for example, is in the same floor. In this case, the flow proceeds to Step S107 to Step S109 (same as the first embodiment).

Note that the second strength is equal to or smaller than the first strength (in other words, second distance is equal to or larger than the first distance). Further, the second strength may be the same as or different from the predetermined strength (see Step S101 of the first embodiment). In other words, the second distance may be the same as or different from the predetermined distance (see Step S101 of the first embodiment). Let's say that the first distance is a distance (for example, 1 meter) close to the MFP 10 on a floor, and the second distance is about a border of a range in which the distance from the MFP 10 is not out of the floor. In this case, the second strength is smaller than the first strength.

Meanwhile, if the distance information determining module 101 of the MFP 10 detects a radio wave smaller than the second strength, the distance information determining module 101 of the MFP 10 determines that the distance between the administrator mobile device 20B and the MFP 10 is larger than the second distance (for example, long distance about 30 meters) (distance from the MFP 10 to the administrator mobile device 20B is larger than second distance) (Step S112, YES). It means that, for example, the administrator who carries the administrator mobile device 20B is on a floor different from the floor on which the MFP 10 is provided.

In this case, the use-allowance inquiry module 106 of the MFP 10 sends an inquiry inquiring whether or not to allow the use of the selected box in association with the administrator identifier to the administrator mobile device 20B via the transmitter-and-receiver device 19 (Step S113).

The box allowing module 204 of the administrator mobile device 20B receives the inquiry inquiring whether or not to allow the use of the selected box from the MFP 10 via the transmitter-and-receiver device 29. The box allowing module 204 displays the inquiry inquiring whether or not to allow the use of the selected box on the display device 27. The box allowing module 204 detects an operation input in the operation device 26 by an administrator to determine whether the use of the selected box is allowed/not allowed by the administrator. The box allowing module 204 sends a response whether the use of the selected box is allowed/not allowed to the MFP 10 via the transmitter-and-receiver device 29 (Step S302).

The use-allowance inquiry module 106 of the MFP 10 receives the response whether the use of the selected box is allowed/not allowed from the administrator mobile device 20B via the transmitter-and-receiver device 19. The use-allowance inquiry module 106 determines whether the use of the selected box is allowed/not allowed by the administrator (Step S114). If the administrator allows the use of the selected box (Step S114, YES), the flow proceeds to Step S107 to Step S109 (same as the first embodiment).

Meanwhile, a case where the administrator does not allow the use of the selected box (Step S114, NO) and a case where the MFP 10 does not receive radio waves from the administrator mobile device 20B (Step S111, NO) will be described. The "case where the MFP 10 does not receive radio waves from the administrator mobile device 20B" means a case where the administrator mobile device 20B is out of the communication range with the MFP 10, or a case where the administrator mobile device 20B does not transmit radio waves since an information processing program is not started or the like. If the MFP 10 does not receive radio waves from the administrator mobile device 20B, the MFP 10 fails to determine the distance to the administrator mobile device 20B.

The distance information determining module 101 of the MFP 10 receives the radio waves from the user mobile device 20A via the transmitter-and-receiver device 19. If the distance information determining module 101 detects a radio wave having the first strength or more, the distance information determining module 101 determines that the distance from the MFP 10 to the user mobile device 20A is equal to or smaller than the first distance (short distance) range (Step S108, YES). Then, the display controller module 105 of the MFP 10 displays the information indicating that the use of the selected box is not allowed on the display device 17a (Step S115). In this case, the MFP 10 may completely disable the use of the selected box, or may require the user to input a password, for example, to use the selected box.

4. Conclusion

According to the present embodiment, effects similar to those of the first embodiment are obtained and, in addition, following effects are obtained.

According to the present embodiment, if the distance from the MFP 10 to the administrator mobile device 20B is a long distance (Step S112, YES), the use-allowance inquiry module 106 of the MFP 10 sends an inquiry inquiring whether or not to allow the use of the selected box in association with the administrator identifier to the administrator mobile device 20B (Step S113). The box allowing module 204 of the administrator mobile device 20B sends a response whether the use of the selected box is allowed/not allowed to the MFP 10 via the transmitter-and-receiver device 29 (Step S302).

As a result, a user can use the selected box without needs of inputting a password, for example, to use the selected box. As a result, a plurality of users do not need to know the password to use the selected box. Therefore high security is provided. Further, an administrator can determine, by himself/herself, whether or not to allow the use of the selected box. Therefore high security is provided.

III. Modification Examples

In the second embodiment, only if the distance from the MFP 10 to the administrator mobile device 20B is a long distance (Step S112, YES), the MFP 10 sends an inquiry inquiring whether or not to allow the use of the selected box to the administrator mobile device 20B (Step S113). To the contrary, irrespective of the distance from the MFP 10 to the administrator mobile device 20B (skip Step S112), the MFP 10 may always send an inquiry inquiring whether or not to allow the use of the selected box to the administrator mobile device 20B (Step S113). As a result, irrespective of the distance to the administrator mobile device 20B, the use-allowance of the selected box by an administrator is always required. Therefore higher security is provided.

In the first embodiment and the second embodiment, all the communication between the MFP 10 and the mobile device 20 (in the second embodiment, the user mobile device 20A and the administrator mobile device 20B) is executed via Bluetooth (registered trademark). Instead, communication, which does not relate to determining a distance based on strength of a radio wave, may be executed via network communication such as via the Internet.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic apparatus, comprising:
   a controller that
   receives a user identifier from a user mobile device, the user mobile device being a mobile device to which a user has logged in, the user identifier identifying the user,
   determines one or more available boxes with reference to attributes of one or more boxes, the one or more boxes storing data files sorted, the attributes being registered for the one or more boxes, the one or more available boxes being boxes available to the user identified by the user identifier,
   sends information indicating the one or more available boxes to the user mobile device,
   receives information indicating one selected box from the user mobile device, the one selected box being a box selected by the user from the one or more available boxes,
   generates display data and loads the display data in a work memory, the display data being used to display information about the selected box,
   determines whether or not a distance to the user mobile device is equal to or smaller than a first distance, and if determining that the distance to the user mobile device is equal to or smaller than the first distance, displays the loaded information on a display device.

2. The electronic apparatus according to claim 1, wherein administrator identifiers are registered for the one or more boxes as the attributes, respectively, and
the controller further,
if receiving information indicating the selected box from the user mobile device,
determines whether or not a distance to an administrator mobile device is larger than a second distance, the administrator mobile device being a mobile device to which an administrator has logged in, the administrator being identified by the administrator identifier registered for the selected box, the second distance being equal to or larger than the first distance,
if determining that the distance to the administrator mobile device is larger than the second distance, sends an inquiry to the administrator mobile device, the inquiry inquiring whether or not the user is allowed to use the selected box, and
if receiving a response that the user is allowed to use the selected box from the administrator mobile device, and if determining that the distance to the user mobile device is equal to or smaller than the first distance, displays the loaded information on the display device.

3. The electronic apparatus according to claim 2, wherein the controller further,
if failing to determine the distance to the administrator mobile device, or
if receiving a response that the user is not allowed to use the selected box from the administrator mobile device,
generates no display data, the display data being used to display information about the selected box.

4. The electronic apparatus according to claim 1, wherein the information about the selected box includes information about data file stored in the selected box.

5. A non-transitory computer readable recording medium that records an information processing program, the information processing program causing a controller of an electronic apparatus to:
receive a user identifier from a user mobile device, the user mobile device being a mobile device to which a user has logged in, the user identifier identifying the user;
determine one or more available boxes with reference to attributes of one or more boxes, the one or more boxes storing data files sorted, the attributes being registered for the one or more boxes, the one or more available boxes being boxes available to the user identified by the user identifier;
send information indicating the one or more available boxes to the user mobile device;
receive information indicating one selected box from the user mobile device, the one selected box being a box selected by the user from the one or more available boxes;
generate display data and loads the display data in a work memory, the display data being used to display information about the selected box;

determine whether or not a distance to the user mobile device is equal to or smaller than a first distance; and
if determining that the distance to the user mobile device is equal to or smaller than the first distance, display the loaded information on a display device.

6. A management system, comprising:
an electronic apparatus; and
a user mobile device, the user mobile device being a mobile device to which a user has logged in,
the electronic apparatus including a controller that
receives a user identifier from a user mobile device, the user mobile device being a mobile device to which a user has logged in, the user identifier identifying the user,
determines one or more available boxes with reference to attributes of one or more boxes, the one or more boxes storing data files sorted, the attributes being registered for the one or more boxes, the one or more available boxes being boxes available to the user identified by the user identifier,
sends information indicating the one or more available boxes to the user mobile device,
receives information indicating one selected box from the user mobile device, the one selected box being a box selected by the user from the one or more available boxes,
generates display data and loads the display data in a work memory, the display data being used to display information about the selected box,
determines whether or not a distance to the user mobile device is equal to or smaller than a first distance, and
if determining that the distance to the user mobile device is equal to or smaller than the first distance, displays the loaded information on a display device.

7. The management system according to claim 6, wherein administrator identifiers are registered for the one or more boxes as the attributes, respectively,
the management system further comprises an administrator mobile device, the administrator mobile device being a mobile device to which an administrator has logged in, the administrator being identified by the administrator identifier registered for the selected box, and
the controller further,
if receiving information indicating the selected box from the user mobile device,
determines whether or not a distance to an administrator mobile device is larger than a second distance, the second distance being equal to or larger than the first distance,
if determining that the distance to the administrator mobile device is larger than the second distance, sends an inquiry to the administrator mobile device, the inquiry inquiring whether or not the user is allowed to use the selected box, and
if receiving a response that the user is allowed to use the selected box from the administrator mobile device, and if determining that the distance to the user mobile device is equal to or smaller than the first distance, displays the loaded information on the display device.

* * * * *